Nov. 21, 1967  J. B. BRIGGS ET AL  3,354,455
DIGITAL DELAY MEASUREMENT SYSTEM
Filed June 14, 1966  5 Sheets-Sheet 3
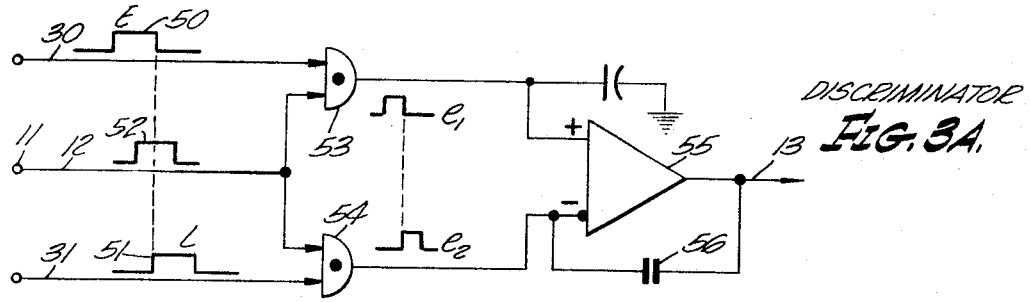
DISCRIMINATOR
FIG. 3A.
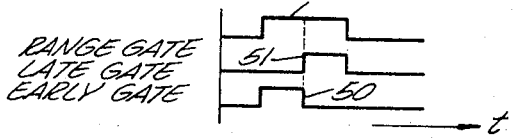
FIG. 3B.
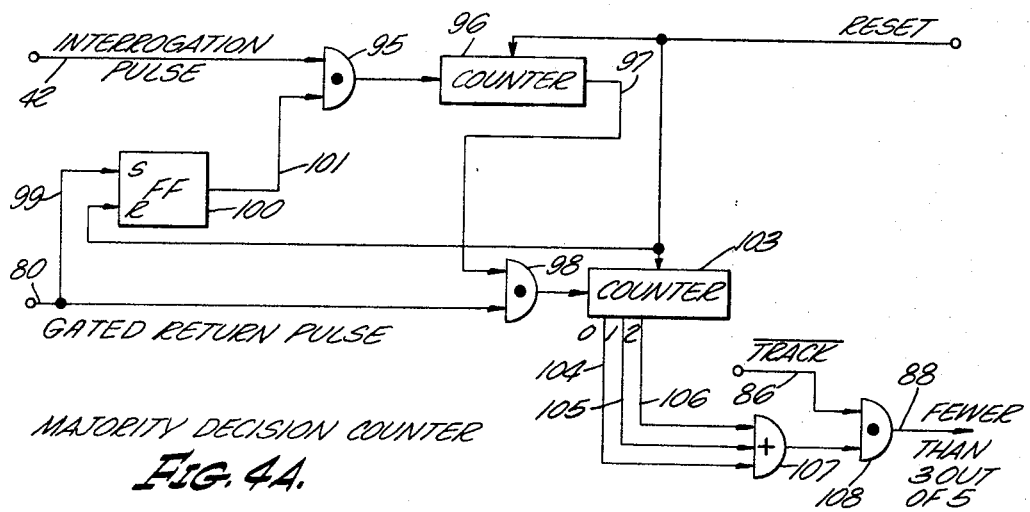
MAJORITY DECISION COUNTER
FIG. 4A.
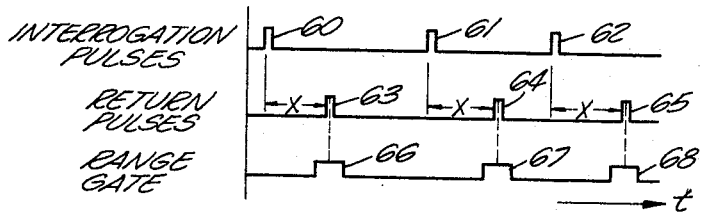
FIG. 4B.
PRF GENERATOR
FIG. 5.
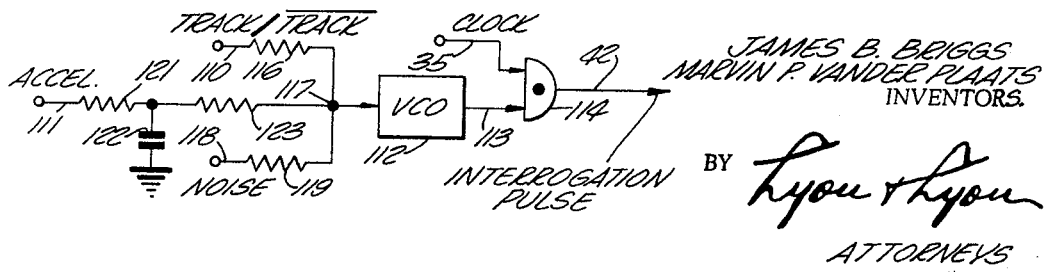
JAMES B. BRIGGS
MARVIN P. VANDER PLAATS
INVENTORS.
BY Lyon & Lyon
ATTORNEYS

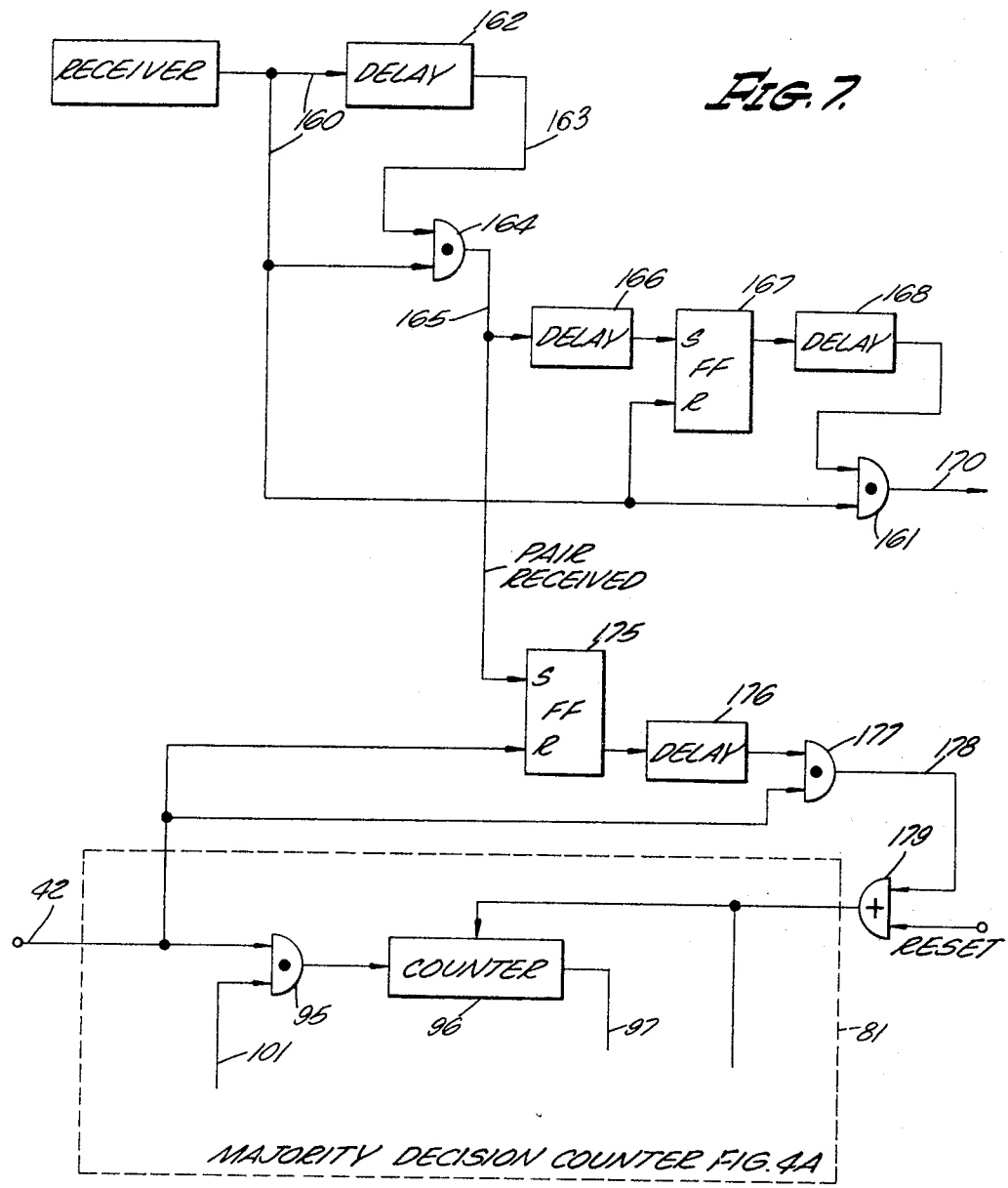

United States Patent Office

3,354,455
Patented Nov. 21, 1967

3,354,455
DIGITAL DELAY MEASUREMENT SYSTEM
James B. Briggs, La Crescenta, and Marvin P. Vander Plaats, Baldwin Park, Calif., assignors to Hoffman Electronics Corporation, El Monte, Calif., a corporation of California
Filed June 14, 1966, Ser. No. 557,559
16 Claims. (Cl. 343—7.3)

ABSTRACT OF THE DISCLOSURE

A system having track and search modes of operation for measuring the time delay between first and second signals wherein an estimate of the time of arrival of the second signal is compared with the second signal to provide an error signal. The error signal is applied to a counting system which changes in a direction to cause the error signal to approach zero, and the contents of which is proportional to the time delay between the first and second signals. The rate of generation of the first signals also may be changed as a function of the error signal. Additionally, circuits for providing the search mode examine the second signals to determine if proper second signals are being received, and the system in the search mode operates at an increased rate.

---

The present invention relates to the measurement of delay and more particularly to a digital system for the accurate measurement of time delay.

Various circuits and systems have been devised for measuring the time delay between events, such as a pair of electrical pulses. Such systems have included the use of either analog or digital techniques in an attempt to make accurate measurements. Probably one of the best known digital techniques is a time interval measurement which may be performed with a conventional counter wherein first and second pulses respectively start and stop the counter during which time clock pulses are applied thereto. The total number of clock pulses counted provides an indication of the time delay between the first and second pulses. Techniques of this nature are satisfactory for many measurements, but are not satisfactory where high accuracy measurements are required, particularly when the signal or pulses may be degraded by noise or other transients, and do not discriminate between proper and improper signals.

One area in which accurate and reliable measurements of time delay are particularly important, and where the signals may be degraded by noise, is in radio air navigation systems, such as in the distance or range measuring portion of a TACAN (tactical air navigation) system. These systems measure both the range and azimuth, or bearing, of a beacon with respect to an airplane and provide visual indications thereof to the pilot of the airplane. A multichannel receiver-transmitter is provided on the airplane and operates with pulses to provide both range and bearing information. A number of ground beacons are available and each includes a transmitter and directional antenna for bearing information and a receiver-transmitter and non-directional antenna for range information. The beacons may be stationary, mobile or on a ship, or another airplane may operate as a beacon.

For range measurements by a TACAN system, the transmitter in the airplane repeatedly transmits very narrow and widely spaced interrogation pulses. These pulses, which actually are pulse pairs, are received by the ground beacon receiver, the transmitter of which transmits "reply" pulses on a different channel. These reply or return pulses are received by the airplane's receiver, and timing circuits measure the round trip travel time, or interval between the interrogation and reply pulses, and convert this interval into signals which operate a range indicator within the airplane.

It will be appreciated that it is desirable to make such interval or time delay measurements in an accurate stable, reliable and simple manner. In view of the fact that various signals are received by the airplane, including those intended for other airplanes, signals reflected from mountains, signals from other sources, etc., and because the proper return signals may be degraded (such as by noise) in some manner, relatively complex systems have been provided for performing these measurements.

Accordingly, it is an object of the present invention to provide an improved system which enables the measurement of time delay in an accurate manner.

It is an additional object of the present invention to provide an improved digital system for measuring the time delay between signals in an accurate and reliable manner.

It is a further object of the present invention to provide an improved system for measuring the time delay between electrical signals in an accurate and reliable manner.

It is an additional object of the present invention to provide a range measuring system for use in radio air navigation for measuring the distance between a moving object and another object in an accurate and reliable manner.

These and other objects and advantages of the present invention will become more apparent upon reference to the accompanying description and drawings in which:

FIGURES 3A and 3C illustrate discriminators, one of which may be employed in the system of FIGURE 1;

FIGURE 3B is a pulse diagram depicting gating pulses used in the system of FIGURE 1;

FIGURE 4A illustrates a majority decision counter employed in the system of FIGURE 1;

FIGURE 4B is a diagram of pulses between which time delay measurements are made;

FIGURE 5 illustrates a pulse repetition frequency generator which may be employed in the system of FIGURE 1;

FIGURE 7 illustrates a circuit for selecting a first pulse of a pulse pair and for indicating that a pulse pair has been received which may be used with the system of FIGURE 1.

In accordance with the preferred embodiment of the present invention, a system for measuring the time delay between first and second signals is provided in which a feedback system essentially compares an estimate of the time of arrival, or average time delay, of the second signal with the second signal to provide an error signal. The error signal is applied to counting means, which change in a direction to cause the error signal to approach zero. The contents of the counting means is proportional to the time delay between the first and second signals.

More particularly, a digital register is employed to count and store an average or predicted time delay. The contents of the register are transferred to a counter which commences to count down at, or substantially at, the time of occurrence of the first signal. After the counter counts down to a predetermined value, such as zero, a comparison subsequently is made by discriminator means to determine if the second signal occurs at the predicted time. An error signal is generated and is a function of the deviation of the time of receipt of the second signal with respect to the predicted time of receipt. The error signal is employed to cause the contents of the register to change to a more accurate prediction if not already correct, the contents thereof being proportional to the time delay between the first and second signals. For certain uses, such as in radio air navigation, means are provided to search for the occurrence of proper second signals, for example, reply pulses from a ground beacon.

Figure 1:
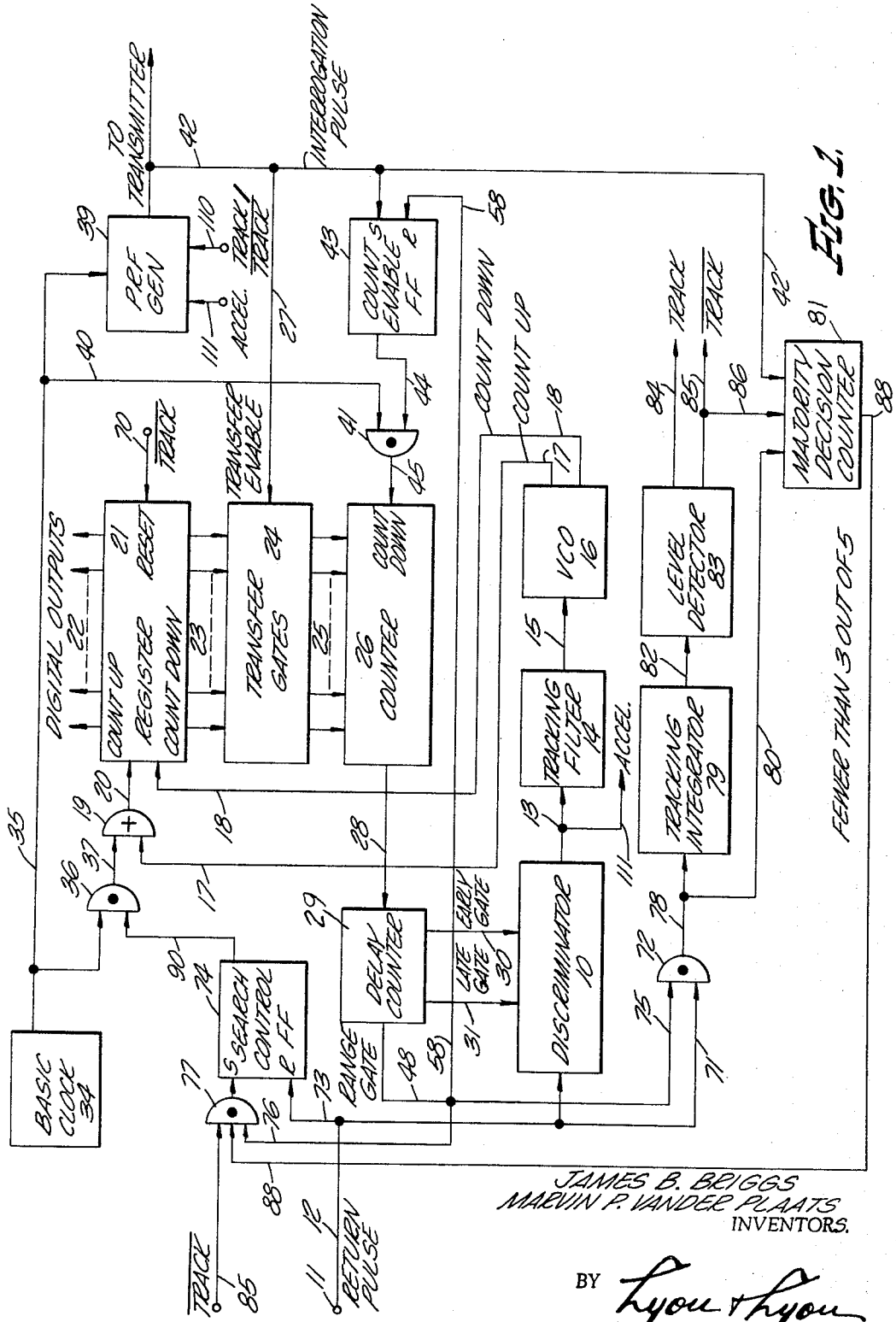
FIGURE 1 is a block diagram of a time delay measuring system according to the present invention.
Figure 2:
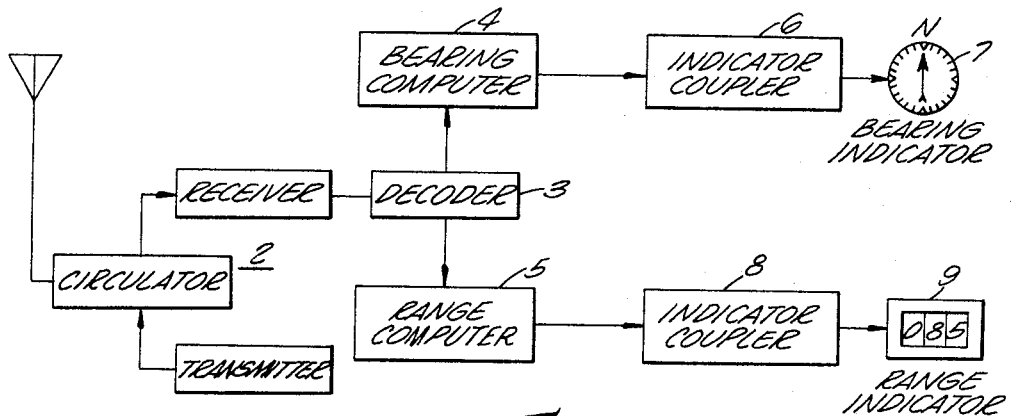
FIGURE 2 illustrates generally an airborne radio air navigation system.

Turning now to the drawings, FIGURE 1 illustrates a system according to the invention for measuring time delay between signals. Although not intending to be limited thereby, this system will be described in the environment of a radio air navigation system, such as a TACAN system for measuring the distance or range between an airplane and a beacon. The beacon may be, for example, a ground beacon, a ship beacon or another airplane acting as a beacon. For background, the navigation system may be of the nature shown in FIGURE 2, and may include the system illustrated in FIGURE 1 as a component thereof. The system shown in FIGURE 2 generally illustrates that portion of a TACAN system carried by the airplane and includes a transmitting and receiving subsystem generally indicated by a reference numeral 2. This latter subsystem may include an antenna coupled with a circulator which directs RF energy to be transmitted from a transmitter to the antenna, and directs RF received energy from the antenna to a receiver. Received signals are applied to a decoder 3 which in turn supplies signals to a bearing computing system 4 and a range computing system 5. The decoder 3 serves to supply the appropriate received signals to either the bearing computing system 4 or the range computing system 5. The output of the bearing computing system 4 is coupled through an indicator coupler 6 to a bearing indicator 7 to provide visual indications of bearing to the pilot of the airplane. The range computing system 5, which may take the form of the system illustrated in FIGURE 1, is coupled through an indicator coupler 8 to a range indicator 9 which serves to provide visual indications of range to the pilot of the airplane.

The bearing computing system 4 may include a system of the nature shown and described in copending U.S. patent application Ser. No. 557,441, filed June 14, 1966, entitled, "Phase Angle Measuring System," filed concurrently herewith by James B. Briggs, the disclosure of which is incorporated herein by reference. The indicator couplers 6 and 8 each may take the form of the system disclosed in copending U.S. patent application Ser. No. 557,509, filed June 14, 1966, entitled, "Digital to Analog Servo System," filed concurrently herewith by James B. Briggs and Shingo Arase, the disclosure of which is incorporated herein by reference.

It will be appreciated that although a system according to the present invention is particularly useful for range measurements in an air navigation system, various applications are possible where accurate and reliable measurements of time delay between signals are required.

The system illustrated in FIGURE 1 includes both means for performing a time delay measurement as well as means for searching for proper return signals. The portion of the system used for time delay measurements includes a discriminator 10 which essentially compares the time of arrival of a signal with a predicted time of arrival. This signal or pulse, which will be described in greater detail subsequently, is applied to a terminal 11 which is connected through a line 12 to an input of the discriminator 10. In an air radio navigation system, the input signal may be received and applied through the decoder 3 to the terminal 11, the decoder serving to shape or standardize the signal or pulse. The output of the discriminator, which is an error signal proportional to the error between the actual time of arrival and the predicted time of arrival, is applied through a line 13, a tracking filter 14 and a line 15 to a voltage controlled oscillator 16. The tracking filter 14 preferably is a low pass filter which provides an average output signal over a number of error signals from the discriminator and aids in the discrimination against noise, spurious signals, etc. In a radio air navigation system, for example, the tracking filter 14 may be a simple resistance-capacitance filter having a one-second time constant to average over 30 to 50 signals from the discriminator 10 to discriminate against noise, etc., as mentioned above, and to enable the pilot to receive meaningful visual indication of range rather than rapidly changing indications which would be substantially impossible to read.

The voltage controlled oscillator 16 responds to the output of the filter 14, which output is an average error signal and may be zero or vary up or down, to provide output "count up" or "count down" signals to respective output lines 17 and 18. If, for example, a pulse is received on the line 12 earlier than predicted, the oscillator 16 provides count down signals on the line 18; whereas count up signals are generated and applied to the line 17 if the received pulse is late.

The count up line 17 is coupled through an "or" gate 19, which will be explained in greater detail subsequently, and a line 20 to a count up input of a counting register 21; whereas the count down line 18 is connected to a count down input of the register 21. The register 21 is a digital register which serves to count input pulses applied thereto to store the resulting count, and to provide an indication of time delay on output lines 22.

In a navigation system, a binary number, such as 40, in the register 21 may serve to indicate a range between the airplane and ground beacon of, for example, one mile. The output of the register 21, for example, is coupled to the indicator coupler 8 of FIGURE 2 which may take the form of the system described in said copending application Ser. No. 557,509 entitled, "Digital to Analog Servo System," for converting the digital output of the register 21 to an analog output. The analog output may be a shaft rotation or an electrical analog signal for operating the range indicator 9 in FIGURE 2 to provide a visual indication of the range to the pilot of an airplane. Additionally, the output of the register 21 may be used directly, or after being converted to an analog form, for supplying information to other aircraft subsystems, such as a flight computer, autopilot, etc.

The outputs of the register 21 also are coupled through lines 23, transfer gates 24 and lines 25 to a counter 26. By providing a "transfer enable" signal on a line 27 coupled to the transfer gate 24, the contents of the register 21 are shifted in parallel into the counter 26. As will be explained in more detail subsequently, the counter 26 counts clock pulses downwardly from the number shifted into the counter, and provides an output on a line 28 upon a predetermined count (such as zero) to initiate gating pulses, which output may be directly initiated by the counter 26 or through the operation of a delay counter 29.

The delay counter 29, which is a conventional counter, provides a gating pulse output after a predetermined delay. This gating pulse may be termed a "range gate" and includes "early" and "late" gate pulses applied through respective lines 30 and 31 to the input of the discriminator 10. The early and late gate pulses each may be, for example, ten microseconds in duration, with the late gate pulse commencing at the termination of the early gate pulse. These pulses are used to "bracket" the return pulse applied to the input terminal 11 and through the line 12 to the input of the discriminator. That is, if the return pulse on the line 12 falls within the overall range gate pulse, an output is provided from the discriminator 10 on the line 13 proportional to the deviation of the return pulse on the line 12 with respect to the center of the ranger gate pulse, the center of the range gate pulse typically occurring at the termination of the early gate pulse and the commencement of the late gate pulse. Thus, the output of the discriminator 13 is an error signal indicating the deviation in time of the return pulse with respect to the estimated time of arrival of the return pulse. The error signal is zero if the return pulse is precisely bracketed by the range gate pulse, or falls entirely outside the range gate pulse.

A master or basic clock 34 is used in the time delay measurements, and may be a precision crystal oscillator. In the case of a radio air navigation system, the frequency of the clock 34 may be 3.23 megacycles, for example. Clock pulses are applied on a line 35 through an "and" gate 36 and a line 37 to an input of the "or" gate 19 for reasons which will be described subsequently. Clock pulses also are applied on the line 35 to a pulse repetition frequency generator 39 and through a line 40 to an input of an "and" gate 41.

The generator 39 is synchronized by the clock 34 and provides "interrogation pulses" on an output line 42. The line 42 is connected to the line 27 to provide transfer enable pulses to enable the transfer gates 24 to transfer data from the register 21 to the counter 26. The line 42 also is connected to a "set" input of a count enable flip-flop 43, the output of which is connected through a line 44 to a second input of the "and" gate 41. The output of the "and" gate 41 is connected through a line 45 to a count down input of the counter 26.

A pulse supplied on the line 42 by the generator 39 enables the transfer gates 24, and sets the flip-flop 43 which in turn enables clock pulses to pass through the gate 41 to the count down input of the counter 26. Each pulse on the line 42 from the generator 39 also is applied to a transmitter when the system is used in a radio air navigation system. In a TACAN system, for example, a pulse from the generator 39 causes the transmitter to transmit a pulse pair to a ground beacon as well as initiates the operation of the time delay measuring system illustrated in FIGURE 1 as discussed above. Subsequently, the ground beacon receives the transmitted pulse pair and, after a predetermined delay in the ground beacon station, transmits a return pulse pair which is received by the airborne receiver. The received pulse pair is decoded, for example, separated from other pulses which may be transmitted by the ground beacon along with the pulse pair. In the present system the first pulse of the pair is selected and applied through the line 12 to the input of the discriminator 10 as the return pulse.

In the operation of the system shown in FIGURE 1, the register 21 initially holds a binary number which results from the register counting clock pulses applied through the "and" gate 36 and the "or" gate 19 as will be explained in greater detail subsequently. This number in the register 21 represents an estimate of the average time delay between first and second pulses, these pulses respectively being the interrogation pulse on the line 42 and a return pulse on the line 12. The generator 39 generates an interrogation pulse which is applied through the line 42 and the line 27 to enable the transfer gates 24, and to set the count enable flip-flop 43. When the transfer gates 24 are enabled, the number stored in the register 21 is transferred in parallel into the counter 26 through the gates 24. When the flip-flop 43 is set, the output thereof on the line 44 goes true thereby enabling the "and" gate 41 to pass clock pulses from the line 40 through the line 45 to the count down input of the counter 26. The counter 26 then subtracts clock pulses, i.e., counts down, until a predetermined number, typically zero, is reached. An output is provided from the counter 26 on the line 28 to the delay counter 29 when this predetermined number is reached.

The delay counter 29 is a short counter to further subtract any desired system delays. For example, in a TACAN system, the delay counter 29 may essentially subtract a delay of fifty microseconds which represents the system time delay of a ground beacon. It will be appreciated that the delay counter 29 need not be used in certain applications or if used, may form a part of the counter 26 by extending the length of this latter counter.

The delay counter 29 provides a pair of output pulses 50 and 51 which are termed early and late gate pulses respectively on lines 30 and 31. A composite of these two pulses is called a range gate pulse 49 and is applied on an output line 48. FIGURE 3B illustrates each of these pulses. In a TACAN system, for example, the delay counter 29 may generate a ten microsecond wide early gate pulse 50 forty microseconds after the delay counter has been enabled by a signal on the input line 28, and generate a ten microsecond wide late gate pulse 51 fifty microseconds after being enabled by the signal on the line 28. Thus, the range gate pulse may have a typical duration of twenty microseconds, with the midpoint of this pulse occurring fifty microseconds after the counter 26 reaches the aforementioned predetermined count and provides an output on the line 28.

As discussed above, the interrogation pulse from the generator 39 causes a pulse to be transmitted to a ground beacon in a navigation system, and this pulse is received by the ground beacon and a return pulse is transmitted after a standard delay. If the number of the register 21 is precisely representative of the distance between the airplane and the ground beacon, the return pulse occurs at the midpoint of the range gate pulse (i.e., centered at the end of the early gate pulse and at the beginning of the late gate pulse) causing the discriminator 10 to provide a zero error signal. If the return pulse does not fall at the midpoint of the range gate pulse, an error signal is provided at the output of the discriminator 10 which is filtered in the tracking filter 14 and applied to control the voltage controlled oscillator 16. If the return pulse is early, the oscillator 16 provides pulses on the count up line 17 causing the register 21 to count up. If the return pulse is late, the oscillator 16 provides pulses on the count down line 18 causing the register 21 to count down. Typically, the oscillator output goes up as high as 50 pulses per second in a navigation system. Depending on the type of oscillator 16 used, its outputs may be either both zero or both equal for a zero input to the oscillator. In either case for a zero error signal the contents of the register 21 remain static.

The above process of sampling return pulses and providing appropriate error and count up or count down pulses is repeated with the number in the register 21 being transferred to the counter 26, the counter 26 counting down, etc., upon the generation of each interrogation pulse thereby causing the system to "track," even though the times of arrival of the return pulses may vary. The contents of the register 21, which may be read out on output lines 22, thus is representative of the time delay between an interrogation pulse and a return pulse. In a navigation system, this time delay is proportional to range and the output of the register 21 may be used to operate a visual indicator within the airplane. Likewise, the output of the register 21 may supply such information to other airplane subsystems, such as flight computer, autopilot, etc.

Turning now to FIGURES 3A and 3B, the discriminator 10 and its operation is shown in detail. A return pulse 52 is applied through the line 12 to "and" gates 53 and 54. The early gate pulse 50 is applied through the line 30 to the "and" gate 53, and the late gate pulse 51 is applied through the line 31 to the "and" gate 54. As shown, the outputs of the "and" gates 53 and 54 respectively represent whether the return pulse 52 is early or late with respect to the midpoint of the range gate pulse 49.

The output of the gate 53 is connected to one input of a differential amplifier 55, and the output of the "and" gate 54 is connected to an inverting input of the amplifier 55. A feedback capacitor 56 is connected between the output and the inverting input of the amplifier 55 and serves to store the difference between the input signals applied to the amplifier 55. A balancing capacitor is connected between the non-inverting amplifier input and ground. The output of the amplifier 55 is the integral of the difference between the input signals $e_1$ minus $e_2$ times a constant, and is a DC output signal indicating where in time the return pulse 52 is in reference to where this pulse is predicted to be as determined by the early and late gate pulses 50 and 51. If the return pulse 52 falls mostly within the early gate pulse 50, the pulse 52 is early; whereas if the pulse 52 falls mostly within the late gate pulse 51, it is late.

The tracking filter 14 (FIGURE 1) averages the error signal output from the amplifier 55, and the voltage controlled oscillator 16 responds to this average error signal and generates output pulses to change the range register 21 to a correct value. Additionally, the range gate pulse is applied through a line 58 to a reset input of the count enable flip-flop 43 to reset this flip-flop which in turn disables the "and" gate 41 thereby preventing further clock pulses from being applied to the input of the counter 26.

Figure 3C:
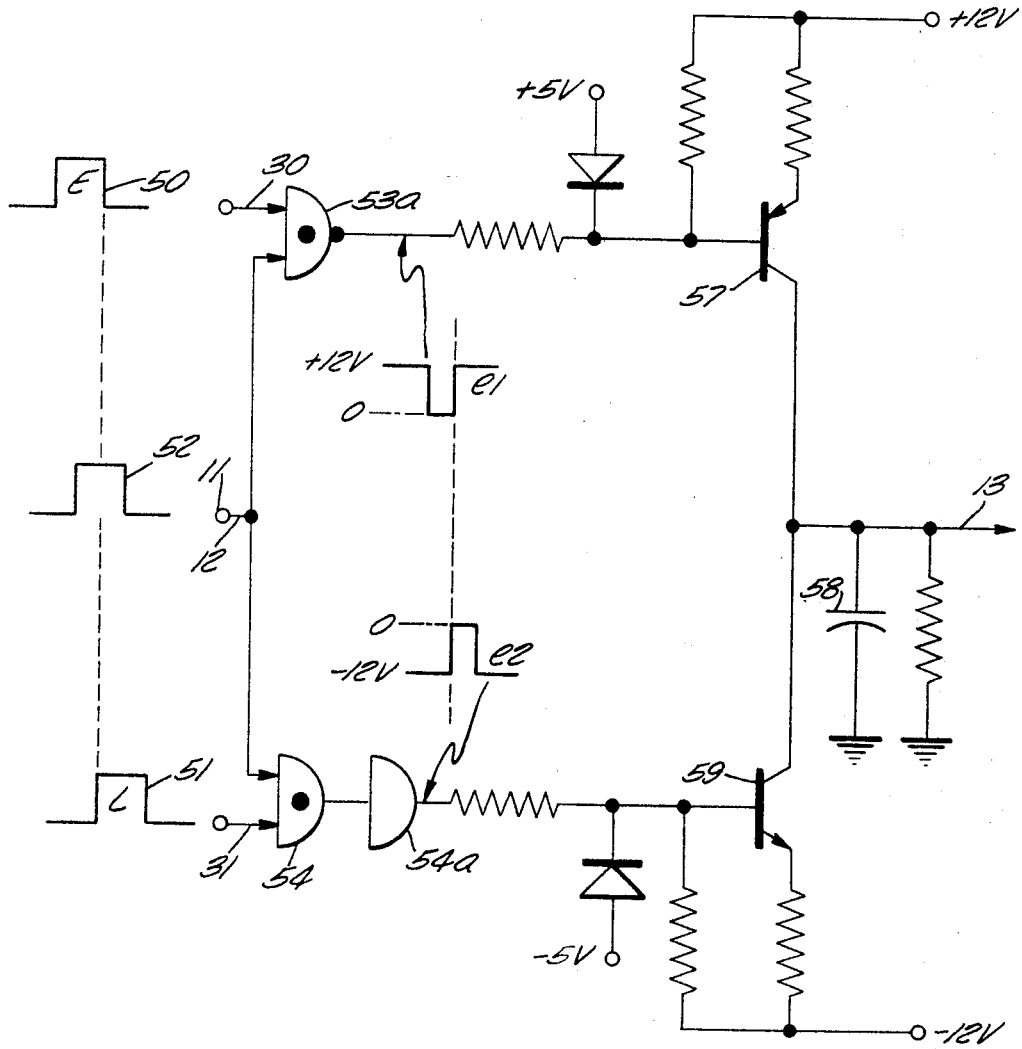

A preferred discriminator having better drift characteristics is shown in FIGURE 3C. Similar components are designated by the same reference numerals used in FIGURE 3A. The lines 12 and 30 are connected to the inputs of an inverting "and" gate 53a, and the lines 12 and 31 are connected to the inputs of the "and" gate 54. The output of the gate 53a is connected through a resistance to the base of a PNP transistor 57 which is clamped to approximately plus five volts through a diode. The base also is connected through a resistance to plus twelve volts, and the emitter thereof is connected through a resistance to the latter voltage source. The collector of the transistor 57 is connected to the output line 13 to supply a constant current to a storage capacitor 58. The output of the "and" gate 54 is connected through an amplifier and level shifter 54a, the output of which is connected through a resistance to the base of an NPN transistor 59. The base of the transistor 59 is clamped to approximately minus five volts through a diode, and connected through a resistance to a minus twelve volt source. The emitter of the transistor 59 is connected through a resistance to this latter voltage source. The collector of the transistor 59 is connected to the line 13 to supply a constant current to the storage capacitor 58 in an opposite direction to that supplied by the transistor 57.

The gates 53a and 54 provide an "and" function on positive going pulses, and the level shifter 54a shifts the levels of pulses it receives to between zero and minus twelve volts. The portion of the pulse 52 which is bracketed by the early gate pulse 50 appears inverted on the output of the gate 53a. Normally the output of this gate is high and the transistor 57 is off. When an output appears from the gate 53a, the signal level goes to ground thereby turning on the transistor 57. The transistor 57 is turned on and provides a constant current to the storage capacitor 58. The base of the transistor 57 is clamped at approximately plus five volts by the diode connected thereto, thereby establishing a fixed current in the collector of the transistor 57. This current places a charge on the capacitor 58 proportional to the width of the pulse $e_1$.

A similar operation is performed by the components in the lower part of FIGURE 3C with respect to the portion of the pulse 52 bracketed by the late gate pulse 51. The output of the level shifter 54a is normally at minus twelve volts, but shifts to zero for the duration of its output pulse $e_2$. The base of the transistor 59 is clamped to approximately minus five volts thereby establishing a constant current through the collector of the transistor 59 equal, but in an opposite direction to, the current supplied by the transistor 57. If the pulse 52 is precisely centered, the charge placed on the capacitor 58 by the transistor 57 is equal to the charge removed, or discharged from, the transistor 59. Otherwise, the charge on the capacitor 58 is proportional to the difference in the length of time in which the pulse 52 is bracketed by one of the gate pulses 50 or 51. Although the circuit arrangement provided in FIGURE 3A is simpler, there are several advantages to the circuit shown in FIGURE 3C. By employing the driving transistors 57 nad 59, a larger current can be driven into the storage capacitor 58. Only a single capacitor 58 is employed, and thus there is no concern about the balance between capacitors. The circuit shown in FIGURE 3C has better drift characteristics inasmuch as the storage capacitor 58 is merely an output storage element and the charge thereon is not referenced back to the input of a comparator amplifier.

In certain applications it is desirable or necessary to search for proper return pulses. This is particularly true in TACAN systems wherein the airborne transmitter transmits interrogation pulses and the airborne receiver receives reply pulses from the ground beacon along with various other pulses, such as reply pulses from the ground beacon to other airplanes. In standard TACAN systems, each airplane's interrogation pulses occur at a rate which is intentionally varied in an irregular or random manner, although over a period of time these pulses occur at a given frequency. For example, during the "tracking mode" in which the range is measured, up to approximately 30 pulses per second are generated; whereas in the "search mode" in which the system searches for proper return pulses, up to approximately 150 pulses per second are generated. Inasmuch as the pulses for each airplane occur in a random manner, the equipment within a given airplane detects proper reply pulses to the airplane by searching for return pulses occurring in the same random pattern as those transmitted from the airplane. Accordingly, the system shown in FIGURE 1 also includes circuits achieving the search function. Essentially, the system searches for three or more return pulses occurring at the proper rate for a given number of transmitted interrogation pulses, and subsequently the system goes into the track mode. If fewer than three out of five proper return pulses are received, the system continues to search for the proper return pulses.

The search system starts to look for a return pulse at a predetermined range, such as zero, and then continuously moves out or extends this range to find a return pulse. When a return pulse is found, the search stops and the system looks at return pulses for a time, i.e., for five pulses, to see if return pulses are occurring at the proper rate. If so, the correct pulses are being received and the system goes into the track mode. If proper pulses are not found three out of five times, the search continues by causing the range register to count out further.

As shown in FIGURE 4B interrogation pulses 60 through 62, and thus the pulses transmitted by the airborne transmitter, occur in a random fashion. Proper return pulses 63 through 65 occur in a like random fashion a substantially fixed delay time "x" after the interrogation pulses. If three of the return pulses 63 through 65 fall properly within respective range gate pulses 66 through 68 (each of which is similar to the range gate pulse 49 in FIGURE 3B), the proper return pulses are being received and the system subsequently goes into a track mode for providing a continuous measurement of time delay, and thus range, as described previously.

A line 70 is connected to a reset input of the range register 21 in FIGURE 1 to reset this register when the system is not in the track mode, and thus is in the search mode. Although the line 70 may receive a voltage level, only the leading edge thereof is used to reset the register 21. After being reset, the register 21 operates in a normal manner to count and store input pulses. The search for proper return pulses may start at a range of zero if the register 21 is set to zero, or at a different range as desired. The return pulses are applied from the terminal 11 through a line 71 to an input of an "and" gate 72, and through a line 73 to a reset input of a search control flip-flop 74. The output line 48 from the delay counter 29, which supplies range gate pulses, is connected through a line 75 to another input of the "and" gate 72. The range gate output line 48 from the counter 29 is connected through a line 76 to an input of an "and" gate 77. The output of the "and" gate 72 is connected through a line 78 to the input of a tracking integrator 79 and through a line 80 to an input of a majority decision counter 81.

The output of the tracking integrator 79 is connected through a line 82 to a level detector 83 which provides "track" and "not track" (track) outputs on respective lines 84 and 85. The "not track" output line 85 is connected through a line 86 to another input of the majority decision counter 81. The interrogation pulse line 42 from the generator 39 is connected to an input of the counter 81. The output of the counter 81 is connected through a line 88 to an input of the "and" gate 77, which also receives a "not track" input from the line 85. The output of the counter 81 is true as long as fewer than three out of five proper return pulses have been received. An output of the flip-flop 74 is connected through a line 90 to another input of the "and" gate 36.

The generator 39 initiates interrogation pulses, such as pulses 60 through 62 shown in FIGURE 4B, which are each followed by the transfer of the contents of the register 21 to the counter 26. After each interrogation pulse, the counter 26 counts down as described previously providing an output to the delay counter 29 which in turn provides the range gate pulse on the output line 48. If the initial contents in the register 21 were zero, the counter 26 provides an output on the line 28 after the transfer since no count down is required. As will appear subsequently, until a sufficient number of proper return pulses are received, the inputs on the line 85 to 88 to the "and" gate 77 are true and, thus, upon the occurrence of the range gate pulse on the line 76 the "and" gate 77 sets the search control flip-flop 74. Whenever the flip-flop 74 is set, it provides a true output on the line 90 to enable the "and" gate 36 to pass clock pulses from the clock 34 through the "and" gate 36 and the "or" gate 19 to the count up input of the register 21. In this manner, the contents of the register 21 are increased, ultimately causing a range gate pulse from the delay counter 29 to occur at a later time to search for, or bracket, a proper return pulse.

Assuming that the first interrogation pulse and the first range gate pulse have been generated as described above and a return pulse is received at the input terminal 11, the search control flip-flop 74 is reset. However, if no return pulse is received, the flip-flop 74 remains set by the gate 77 and allows the contents of the register 21 to continue to increase. Assuming that a pulse is received but it is not a proper return pulse (not bracketed by the range gate pulse), the output of the "and" gate 72 is false because both inputs thereto are not true at the same time. Thus, this return pulse is not counted by the majority decision counter 81. If the return pulse is a proper return pulse, i.e., bracketed by the range gate pulse, the output of the "and" gate 72 provides a true output on the line 78. This output is applied to the input of the majority decision counter 81 and counted.

Assuming now that another interrogation pulse is generated followed by another range gate pulse, the flip-flop 74 is again set because all inputs to the "and" gate 77 are true. Again, if no return pulse is received, the flip-flop 74 remains set thereby causing the contents of the register 21 to be up-dated. However, the next return pulse will reset the flip-flop 74. If this next return pulse is not a proper return pulse, it will not be counted by the majority decision counter 81, but will be counted if it is a proper return pulse. As long as fewer than three out of five proper return pulses are received, the output of the counter 81 on the line 88 remains true. Likewise, if a sufficient number of proper return pulses are not received, the "not track" output line 85 of the level detector 83 is true. After three proper return pulses have been received, the output of the counter 81 goes false thereby causing the output of the "and" gate 77 to go false. This prevents the flip-flop 74 from being set again when the range gate pulse occurs, and thus the register is not further updated by clock pulses from the "and" gate 36.

FIGURE 4B illustrates three proper return pulses 63 through 65 which cause the counter 81 to provide a false output thereby disabling the "and" gate 77. The next return pulse resets the search control flip-flop 74 thereby preventing the clock pulses from being passed through the "and" gate 36 to the register 21. Since a sufficient number (three) of pulses have been received, the output of the "and" gate 77 remains false and does not set the flip-flop 74.

The tracking integrator 79, which may include a resistance-capacitance circuit, averages the pulses applied to the input thereof and its output increases in level. When the output on the line 82 goes up to a given level, in response to a sufficient number (such as five) of proper return pulses, the level detector 82 provides a true output on the line 84 and a false output on the line 85 and the system goes into the track mode. When the system goes into the track mode, the frequency of interrogation pulses is reduced as will be explained subsequently in the description of FIGURE 5.

The tracking filter 14 has a "velocity memory" even if pulses are lost temporarily. The error signal stored therein, such as on a capacitor, holds a voltage which continues to maintain the oscillator 16 at a given output rate for driving the register 21. Also, the level in the tracking integrator 79 stays up in a similar manner to maintain the system in the track mode even if several proper return pulses are lost temporarily.

The system remains in the track mode until reset, such as when the system is switched to track return pulses from another ground beacon, or until a number of proper return pulses are not received in which case the signal on the line 82 goes down and the output on the line 85 from the level detector 83 goes true. Other ground beacons may be selected in a conventional manner by switching channels, in which case the range system in FIGURE 1 is reset.

FIGURE 4A illustrates the circuit for the majority decision counter 81. This circuit serves to count proper return pulses when the system is in the search mode, and provides a true output as long as fewer than three proper return pulses have been received when five interrogation pulses are generated. The interrogation pulse line 42 from the generator 39 is connected to an input of an "and" gate 95, the output of which is connected to the input of a counter 96 which provides a true output level on a line 97 for a predetermined number of counts, such as one through five counts. The output line 97 is connected to an input of an "and" gate 98 and the line 80 is connected to another input of the gate 98. The line 80 also is connected through a line 99 to the set input of a flip-flop 100, the output of which is connected through a line 101 to another input of the gate 95. The output of the "and" gate 98 is connected to an input of a counter 103, and the respective zero, one, and two output lines 104 through 106 thereof are connected through an "or" gate 107 to an input of an "and" gate 108. Thus, the output of the "or" gate 107 is true when the output of the counter 103 is between zero and two. The "not track" line 86 is connected to another input of the "and" gate 108, and the output of the "and" gate 108 on the line 88 indicates fewer than three out of five gated return pulses have been received when this output is true.

The first gated return pulse on the line 80 sets the flip-flop 100 which in turn enables the "and" gate 95. When the "and" gate 95 is enabled, interrogation pulses on the line 42 are passed to the counter 96 and counted. The counter 96 provides a voltage level or true output for counts of one through five. Thus, after an interrogation pulse has been counted by the counter 96 (and until the counter 96 is reset which typically occurs some time after the fifth pulse has been counted) the output thereof enables the "and" gate 98 to pass gated return pulses to the counter 103. Until the counter 103 counts three pulses, the "or" gate 107 provides a true input to the "and" gate 108. A true input (track) is applied on the line 86 to the "and" gate 108 which provides a true output on the line 88 indicating that fewer than three out of five proper return pulses have been received. When the counter 103 counts three pulses, the output of the "or" gate 107 goes false causing the output of the "and" gate 108 to go false. The output of the "and" gate 108 is used as discussed previously to enable or disable the "and" gate 77 in FIGURE 1 which allows the search control flip-flop 74 to be set in the "not track" mode during range gate pulses when a sufficient number of proper return pulses have not been received.

The pulse repetition frequency generator 39 in FIGURE 1 includes an input line 110 which supplies signals thereto indicative of whether the system is in the track or track (search) mode. These signals may be derived from the level detector 83. The discriminator 10 provides an output on the line 13 which is applied through a line 111 to the generator 39. The generator 39 is shown in greater detail in FIGURE 5, and essentially includes a voltage controlled oscillator 112 connected through a line 113 to an "and" gate 114 to provide interrogation pulses on an output line 42 synchronized with clock pulses from the basic clock 34. The line 110 is connected through a resistance 116 to a summing junction 117 which is connected to the input of the voltage controlled oscillator 112. A terminal 118 is connected through a resistance 119 to the summing junction 117 to supply noise input signals to the oscillator 112. As is conventional, the output frequency of the oscillator 112 is determined by the voltage input thereto. One voltage level (such as a true signal) is applied on the line 110 in the track mode to cause the oscillator 112 to provide an output at one frequency, such as between 3 and 30 pulses per second; whereas another voltage level (such as a false signal) is applied to the line 110 in the search mode to cause the oscillator to provide output pulses at another frequency, such as between 30 and 150 pulses per second. The noise input line 118 is used to cause the frequency of the oscillator 112 to vary in a random manner, and typically a mixture of sine waves is applied to the line 118.

When used in a navigation system, the output voltage of the discriminator 10 in FIGURE 1 is proportional to the change of velocity with respect to the change in time (i.e., $dv/dt$), and therefore, is proportional to acceleration of the airplane with respect to the ground beacon. Accordingly, this voltage may be applied through the line 111 and a low pass filter including a resistance 121 and capacitance 122, and through a summing resistance 123 to the summing junction 117 to affect the operation of the oscillator 112. This can be used to increase the output frequency of the oscillator 112 when the acceleration is high; and to decrease the output frequency thereof when the acceleration is low. Inasmuch as any individual ground beacon must communicate with a number of planes at any given time, it is helpful if the rate at which a plane communicates with the beacon is as low as possible while still providing the necessary information to the pilot. The use of the voltage proportional to acceleration can reduce the rate at which interrogation pulses are generated when a high rate is not required; but increase this rate up to a standard maximum rate when the range information must be up-dated frequently. The input voltage, as well as the values of the summing resistances 116, 119 and 123, determine the frequency of operation of the oscillator 112.

Figure 6:
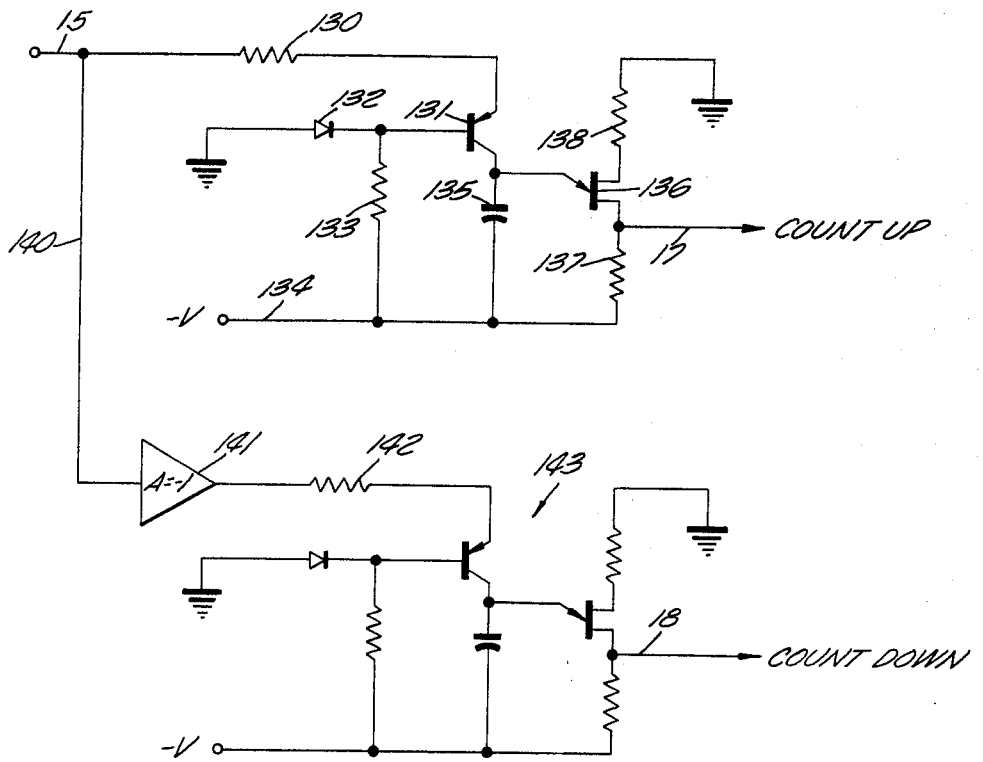
FIGURE 6 is a circuit diagram of a voltage controlled oscillator which may be utilized in the system of FIGURE 1.

The voltage controlled oscillator 16 in FIGURE 1 may be as shown in FIGURE 6. The oscillator responds to positive and negative error signals averaged by the tracking filter 14 to provide count up or count down pulses to the register 21. For example, a positive input to the oscillator may indicate that the return pulse occurred early in which case count down pulses are provided; whereas the output may be negative indicating that the return pulse occurred late in which case count up pulses are generated. When the error signal is zero neither count up nor count down pulses are generated.

The voltage controlled oscillator shown in FIGURE 6 essentially includes a pair of relaxation oscillators. The line 15 is connected through a resistance 130 to the emitter of a PNP transistor 131. A diode 132 is connected between ground and the base of the transistor 131, and the base of this transistor is connected through a resistance 133 to a line 134 connected to a source of negative voltage. The transistor 131, and the resistors 130 and 133 function as a constant current source for supplying current to a capacitor 135 which is connected between the collector of the transistor 131 and the line 134. The collector of the transistor 131 is connected to the emitter of a unijunction transistor 136. One base of the transistor 136 provides count up pulses on the output line 17, and this base is connected through a resistance 137 to the line 134. The second base of the transistor 136 is connected through a resistance 138 to ground.

With a zero input voltage on the line 15, no current is supplied to the constant current source and the transistor 131 is off because the voltage drop across the diode 132 is balanced by the voltage drop across the emitter junction of the transistor 131. When a positive voltage is applied to the line 15, a current passes through the resistor 130 and the transistor 131 to charge the capacitor 135. When the voltage across the capacitor 135 reaches the peak voltage for the unijunction transistor 136, this latter transistor begins to conduct and discharge the capacitor 135. This results in oscillation and the generation of count up pulses on the line 17.

The line 15 also is connected through a line 140, and inverting unity gain amplifier 141, and a resistor 142 to an oscillator generally designated by reference numeral 143 the same as the one described above. Because of the use of the unity gain inverting amplifier 141, the oscillator 143 responds to negative voltage inputs on the line 15 to provide output count down pulses on the output line 18.

In systems, such as radio navigation systems, which employ pulse pairs rather than single pulses in time delay measurements, the proper pulse of the pair must be used. In typical prior systems, the existence of a pulse pair was detected essentially by delaying the first pulse of the pair and using this delayed pulse to gate the second pulse of the pair. The system of the present invention operates with, i.e., makes a measurement with respect to, the first pulse of a returned pulse pair rather than the second pulse of the pair. The novel features of the present system enable the first pulse to be used in order to provide better accuracy and resolution. However, it is desirable that the second pulse of a pair not be passed to, and utilized by, the time delay measuring system. This may be accomplished in various ways, and conventional counting techniques may be employed for this purpose. Essentially, return pulses from the receiver are passed to a counter which starts counting clock pulses upon the occurrence of the first pulse of the pair. The counter counts to a predetermined number of recycles, this number generally being dependent upon the spacing of the pulses of a pair. As long as the counter is counting (all stages thereof are not zero), the second pulse of the pair is not accepted. This may be accomplished by sensing the states of the stages of the counter to prevent the passage of the second pulse to the system as long as all stages of the counter are not zero.

FIGURE 7 illustrates a preferred circuit for selecting the first pulse of a pair, and for indicating that a pair has been received. This circuit is described and claimed in U.S. patent application Ser. No. 557,574, filed June 14, 1966, entitled "Pulse Pair Measurement," filed concurrently herewith by James B. Briggs, the disclosure of which is incorporated herein by reference. The output of the receiver supplies return pulse pairs through a line 160 to an input of the "and" gate 161 and to a delay circuit 162. The delay circuit 162 may include a counter which provides a delay the same as the delay between the pulses of a pair, for example twelve microseconds. The output of the delay circuit 162 is applied through a line 163 to the input of an "and" gate 164. The line 160 also is connected to the gate 164. The gate 164 provides an output on a line 165 indicating that a pair has been received when the first pulse delayed by circuit 162 occurs with the second pulse of the pair. The line 165 is connected through a delay circuit 166 to the set input of a flip-flop 167, and the line 160 is connected to the reset input thereof. The output of the flip-flop 167 is connected through a delay circuit 168 to another input of the "and" gate 161. The total delay of the circuits 166 and 168 is greater than the pulse width of a pulse. Hence, each may provide a two microsecond delay for an input pulse width of three microseconds. The output of the gate 161 is connected through a line 170 to the input terminal 11 in FIGURE 1.

Assuming that the flip-flop 167 is set (upper output is true), the gate 161 is enabled and the first pulse of a pair passes through the gate 161 to the output line 170. This pulse also resets the flip-flop 167, and after the delay time of the circuit 168 the gate 161 is disabled. The first pulse also is delayed by the delay circuit 162. When the second pulse of the pair arrives, it does not pass through the disabled gate 161. However, the gate 164 is enabled at this time (by the delayed first pulse, and the second pulse) and sets the flip-flop 167 after the delay of the circuit 166. After the delay of the circuit 168, the gate 161 is enabled to pass the first pulse of the next pair. The delays provided by the circuits 166 and 168 ensure that the gate 161 is not enabled or disabled too soon, and ensure that at least the leading edge of the first pulse of a pair is passed.

The output of the gate 164 may be used to indicate that a pair, rather than a single false pulse, is received in the search mode to prevent the system in FIGURE 1 from continuing to search for false pulses. That is, if a false pulse is received, the majority decision counter 81 can be reset rather than waiting to detect further reply pulses. The line 165 is connected to the set input of a flip-flop 175. The lower output (false when the flip-flop is set) is connected through a delay circuit 176 to an input of an "and" gate 177. The interrogation pulse line 42 is connected to the reset input of the flip-flop 175 and to another input of the gate 177. The output of the gate 177 is connected through a line 178 to an "or" gate 179. A reset line also is connected to the gate 179. The output of the gate 179 is connected to the reset input of the majority decision counter 81. An interrogation pulse on the line 42 resets the flip-flop 175 causing the lower output thereof to go true. After a short delay, the gate 177 is enabled. If no pair is received, the next interrogation pulse causes the output of the gate 177 to go true thereby resetting the majority decision counter 81 through the gate 179. If a pair had been received, the flip-flop would have been set thereby disabling the gate 177. In this case, the following interrogation pulse would not cause the counter 81 to be reset.

While the present invention has been described in connection with use in a radio air navigation system, it should be understood that the invention may be used in various applications where accurate measurements of time delay are desired. The invention, therefore, may be embodied in other forms not departing from the spirit or central characteristics thereof. The present embodiment is to be considered in all respects as illustrative and not restrictive, the scope of the invention being indicated by the appended claims rather than by the foregoing description and all changes which come within the meaning and range of equivalency of the claims are therefore intended to be embraced thereby.

What is claimed is:

1. A system for measuring the time delay between first and second time spaced signals comprising:
   first means for comparing a second of said signals with a gate signal representing the predicted time of arrival of said second signal, said gate signal being generated in response to a first of said signals, and said first means providing an error signal proportional to the time deviation of said second signal from the predicted time represented by said gate signal,
   second means coupled with the output of said first means for providing output signals as a function of said error signal,
   third means coupled with said second means for accumulating and storing the output signals of said second means, the contents of said third means being representative of the predicted time delay between said first and second time spaced signals,
   fourth means coupled with said third means for enabling the contents of said third means to change at a predetermined rate and to generate said gate signal after the occurrence of a predetermined change of said contents, and
   fifth means for generating a plurality of said first signals coupled with said fourth means for controlling the operation thereof, said error signal from said first means being coupled to said fifth means to affect the rate at which said fifth means generates said first signals as a function of said error signal.

2. A system as in claim 1 wherein:
   said fifth means includes a variable oscillator, and means coupling said error signals from said first means to said oscillator to control the operation thereof as a function of said error signal.

3. A system as in claim 2 including searching means coupled with said third means for causing the contents thereof to change at a higher rate for enabling said system to rapidly search for proper second of said signals, and
   control means coupled with said fifth means for supplying a predetermined signal to said oscillator for increasing the output thereof in the absence of fewer than a predetermined number of said second of said signals.

4. A system for measuring the time delay between generated first signals and received second signals comprising:
   discriminator means for comparing said second signals with respective gate signals representing the predicted times of arrival of said respective second signals, said gate signals being respectively generated in response to said first signals, and said discriminator means providing error signals proportional to the time deviation of said second signals from predicted times represented by respective gate signals,
   pulse generating means coupled with the output of said discriminator means for providing output signals as a function of said error signal,
   register means,
   counter means,
   gating means coupling said register means with said counter means,
   said register means being coupled with said pulse generating means for accumulating the output signals of said pulse generating means, the contents of said register means being representative of the predicted time delay between respective first and second signals,
   enabling means coupled with said gating means and counter means for transferring the contents of said register means to said counter means and for enabling the contents of said counter means to change at a predetermined rate and to generate said gate signals after the occurrence of a predetermined change of said contents in said counter means, and searching means coupled with said register means for causing a change of the contents thereof faster than when said register means is accumulating the output signals of said pulse generating means, said searching means including gating means coupled with said register means and responsive to said gate signals and fewer than a predetermined number of said second signals for causing the contents of said register means to change at said faster rate.

5. A system as in claim 4 wherein:
said searching means includes counting means which disables said searching means upon receipt of a predetermined number of said second signals.

6. A system for measuring the time delay between first and second time spaced signals and for determining the receipt of said second signals comprising:
generating means for initiating the first of said time spaced signals at a plurality of rates, range means responsive to said generating means for comparing the second of said time spaced signals with respective gate signals representing the predicted time of arrival of said second signals to provide an error signal, said range means including counting means responsive to said error signal, the contents of said counting means being proportional to the time delay between said first and second signals, and searching means for controlling the operation of said range means and said generating means, said searching means being responsive to said gate signals and said second signals for causing said generating means to operate at a higher rate and for causing said counting means to operate at a higher rate until a predetermined number of said second signals are received by said system.

7. A system as in claim 6 including:
means coupling said error signal to said generating means for controlling the rate at which said generatmeans coupling said error signal to said generating 8. A navigation system including a transmitter for transmitting a pulse pair to a beacon in response to a first signal, and a receiver for receiving a second signal comprising a second pulse pair transmitted by said beacon in response to said pulse pair transmitted by said transmitter, a system having track and search modes of operation coupled with said receiver for measuring the time delay between said first signal and the first pulse of said second pulse pair and for searching for a predetermined number of said first pulses comprising:
generating means for generating a plurality of said first signals at a plurality of rates, discriminator means for comparing said first pulse of said second pulse pair with a gate signal representing the predicted time of arrival of said first pulse, said gate signal being generated in response to said first signal, and said discriminator means providing an error signal proportional to the time deviation of said first pulse from the predicted time represented by said gate signal, oscillator means coupled with the output of said discriminator means for providing output signals as a function of said error signal, counting means coupled with said discriminator means to supply said gate signal thereto, and coupled with said oscillator means for accumulating and storing the output signals of said oscillator means, the contents of said counting means being representative of the predicted time delay between said first signal and said first pulse, count enable means coupled with said generating means and said counting means for enabling the contents of said counting means to change at a predetermined rate and to generate said gate signal after the occurrence of a predetermined change of said contents, and search control means coupled with said counting means and said generating means, said search control means being responsive to receipt of fewer than a predetermined number of said first pulses for causing the rate of accumulation of said counting means to increase and for causing the rate of generating of said first signals to increase.

9. A navigation system as in claim 8 wherein
said search control means includes decision counter means responsive to said first pulses, gate signals and first signals for determining when a predetermined number of said first pulses are received.

10. A navigation system as in claim 8 including:
means coupling said error signal to said generating means for affecting the rate at which said generating means generates said first signals as a function of said error signal.

11. A system for measuring the time delay between generated first signals and received second signals and for determining the existence of said second signals comprising:
generating means for generating interrogation pulses at a plurality of rates, said first signals being generated in response to said interrogation pulses, a feedback circuit means for comparing an estimate of the time of arrival of said second signals respectively with said second signals to accumulate data proportional to the time delay between said first and second signals, said feedback circuit means including discriminator means responsive to gate signals and said second signals for generating an error signal and counting means responsive to said error signal for accumulating said data, count enable means being coupled with said generating means and said feedback circuit means for enabling operation of said feedback circuit means in response to interrogation pulses, track detection means coupled with said feedback circuit means and responsive to said gate signals and said second signals for causing said system to operate in a track or search mode, said track detection means being coupled with said generating means to increase the rate of generation of said first signals when said system is in a search mode, and searching means coupled with said feedback circuit means for causing said counting means thereof to accumulate at a higher rate when said system is in said search mode, said search means including control means and decision counter means, said decision counter means being responsive to the occurrence of second signals during the occurrence of respective gate signals, and responsive to said track detection means and interrogation pulses from said generating means to provide an output to said control means of said searching means indicative of the receipt of fewer than a predetermined number of second signals.

12. A system as in claim 11 wherein:
said decision counter means provides a control output to said control means to cause said searching means to maintain said system in a search mode when fewer than said predetermined number of said second signals are received.

13. A system as in claim 11 including:
means coupling said error signal of said feedback circuit means with said generating means to affect the rate at which said generating means generates said interrogation pulses.

14. A system for measuring the time delay between time spaced signals comprising:
discriminator means for comparing a second of said time spaced signals with a gate signal representing the predicted time of arrival of said second signal, said gate signal being generated in response to a first of said time spaced signals, and said discriminator means providing an error signal proportional to the time deviation of said second signal from the predicted time represented by said gate signal, error pulse generating means coupled with the output of said discriminator means for providing output signals as a function of the sense and magnitude of said error signal, said error pulse generating means including an oscillator for providing said output signals at a frequency proportional to the magnitude of said error signal, counting means coupled with said pulse generating means for accumulating and storing the output signals thereof, the contents of said counting means being representative of the predicted time delay between said first and second spaced signals, enabling means coupled with said counting means for enabling the contents of the counting means to change at a predetermined rate and generate said gate signal after the occurrence of a predetermined change of said contents, said enabling means including gating means operable in response to a first of said time spaced signals, and search control means coupled with said generating means to increase the frequency of generation of interrogation pulses in a search mode of operation, said search control means including gating means responsive to said second signal and said gate signal for causing said system to operate in a search mode when fewer than a predetermined number of said second signals are received by said system.

15. A system as in claim 14 including:

generating means for generating interrogation pulses which in turn cause the generation of said first signals, and means coupling the error signal of said discriminator means to said generating means to control the rate at which said interrogation pulses are generated.

16. In a range measuring system including a feedback tracking system for determining the time delay between first and second signals, said feedback system including a register for accumulating a number of signals and providing an indication of said time delay, a searching system coupled with said range system comprising:

first means coupled with said tracking system for providing an output to cause said range measuring system to operate in a tracking or searching mode, said first means being responsive to a gate signal generated by said tracking system which is a function of the predicted time delay between said first and second signals and responsive to said second signals, and search control means coupled with said register of said tracking system for causing said register to accumulate at a higher rate when said range measuring system is in said searching mode, said search control means being responsive to said gate signal and receipt of a predetermined number of said second signals.

References Cited

UNITED STATES PATENTS

| | | | |
|---|---|---|---|
| 3,075,189 | 1/1963 | Lisicky | 343—7.3 |
| 3,246,324 | 4/1966 | Price | 343—7.3 |

RICHARD A. FARLEY, *Primary Examiner.*

RODNEY D. BENNETT, *Examiner.*

T. H. TUBBESING, *Assistant Examiner.*

UNITED STATES PATENT OFFICE
CERTIFICATE OF CORRECTION

Patent No. 3,354,455                                                                    November 21, 1967

James B. Briggs et al.

It is certified that error appears in the above identified patent and that said Letters Patent are hereby corrected as shown below:

Column 15, lines 38 to 41, claim 7 should appear as shown below:

7. A system as in claim 6 including:
    means coupling said error signal to said generating means for controlling the rate at which said generating means generates said first signals.

Signed and sealed this 21st day of April 1970.

(SEAL)
Attest:

Edward M. Fletcher, Jr.                                      WILLIAM E. SCHUYLER, JR.
Attesting Officer                                                    Commissioner of Patents